United States Patent [19]

Korenhof et al.

[11] 4,047,770

[45] Sept. 13, 1977

[54] HUB BEARING UNIT ASSEMBLY

[75] Inventors: Abraham Korenhof, Driebergen; Hendrikus Jan Kapaan, Ijselstein, both of Netherlands

[73] Assignee: SKF Industrial Trading and Development Company, B.V., Nieuwegein, Netherlands

[21] Appl. No.: 615,500

[22] Filed: Sept. 22, 1975

[30] Foreign Application Priority Data

Sept. 30, 1974 Netherlands .......................... 7412873

[51] Int. Cl.² .............................................. F16C 33/00
[52] U.S. Cl. .................................. 308/191; 180/43 R; 301/6 D
[58] Field of Search ................ 308/191; 301/6 R, 6 D; 180/43 R, 46, 47, 75, 85, 88

[56] References Cited

U.S. PATENT DOCUMENTS

| 3,583,511 | 6/1971 | Asberg .............................. 308/191 X |
| 3,944,011 | 3/1976 | Ernst et al. ...................... 180/43 R X |

*Primary Examiner*—Philip Goodman
*Assistant Examiner*—Gene A. Church
*Attorney, Agent, or Firm*—Daniel M. Rosen

[57] ABSTRACT

A hub bearing unit assembly having an inner and outer race ring, which being unified with a fastening flange, with rows of rolling elements located between the races, said rolling elements being separated from one another by means of a cage, as well as comprising seals, which retain a lubricant contained between the rolling elements, the bearing parts being connected to a shaft or part of a shaft, wherein the end part of the inner race opposite the flange section and situated outside the inner side of said race ring, the so-called head section, comprises coupling elements by means of which the race is connected to the shaft or a part of it so as to transmit power.

14 Claims, 1 Drawing Figure

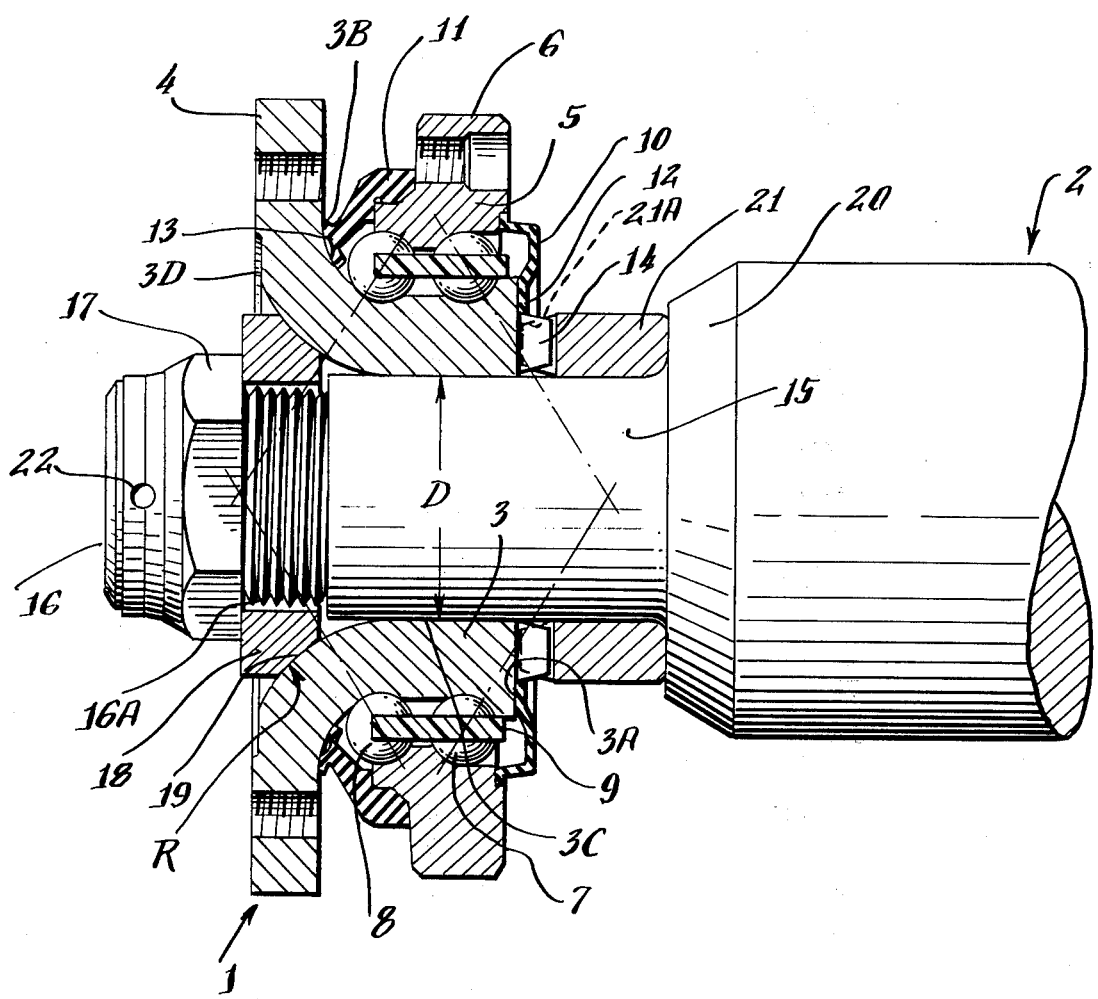

HUB BEARING UNIT ASSEMBLY

The present invention relates to bearing construction and more particularly to a hub bearing unit.

In conventional hub bearing units, the inner and outer race rings are unified by a fastening flange, and wherein rows of rolling elements are located between the races. The rolling elements are separated from one another by a cage, and seals for retaining a lubricant are applied. The bearing can be connected to a shaft or to part of the shaft. Such a bearing is described in the French patent specification 2.206.814, for example.

The present invention relates to such types of bearing assemblies, wherein a spline connection between the inner race and shaft is absent, with however optimum drive of the component connected to the inner race still assured. In addition, the proposed improvement provides a favorable stress distribution in the bearing race during loading.

In accordance with the invention, the part of the inner race opposite the flange and outside of the inner diameter — the so-called head section or end race part — is provided with elements by means of which the race ring is power transmittably connected to the shaft or to a part of the shaft. In this manner, the prime object is achieved since relatively expensive machining operations such as milling and finish machining of the internal splining on the inside diameter of the inner race as well as the external splining on the shaft itself is avoided, fastening elements being now located on the easily accessible and machinable head section of the bearing race. Moreover, the present invention allows the application of a smooth shaft.

In a preferable embodiment, the fastening elements comprise teeth into which the teeth of a ring-like element fitted over the shaft mesh, or into which teeth formed in the shoulder of a shaft, engage. This provides a reliable fastening of shaft and bearing parts in a simple manner.

The British patent specification No. 1.267.599 discloses a coupling assembly comprising a roller bearing with separated inner race rings, each being provided with teeth meshed or engaged into each other. However, this known assembly completely differs from the hub bearing unit assembly of the present invention in that the race rings herein are unified with fastening flanges to which various wheel parts can be attached directly. Such an assembly shows a different stress distribution in its race rings compared to the bearing parts as applied in the above cited prior art coupling assembly. In addition, the hub bearing unit assembly according to the invention comprises fewer different parts and is very simple in its shape.

According to another important embodiment, the part of the shaft which is connected to the bearing, and which, because of the relatively large inside diameter of the inner race, is provided with a fine thread and lock nut comprising an insert or thrust collar that fits against a smooth or rounded flange outer face. In this matter, clearance in the fastening element between the inner race and shaft can be eliminated by tightening the nut, and, simultaneously, a uniform stress distribution is achieved in the flange and the actual bearing race element.

The invention will now be described by way of an example and with reference to the accompanying drawing, which represents a bearing assembly comprising a bearing 1 and a shaft 2.

The bearing 1 comprises an inner race 3, which at one end passes over into a fastening flange, as well as an outer race 5, which also forms an integral unit with a fastening flange 6. Two rows of rolling elements 7 and 8, pair-off and are separated from one another by a cage 9, and are located between the two race rings 3 and 5. Seals 10 and 11, which are fastened in outer race 5 and are supported at the sealing ends 12 and 13, respectively, on the inner race 3, are attached between the inner and outer races 3, 5. The sealing end 12 rests on the so-called head section 3A of the inner race 3, while the sealing section 13 of seal 11 contacts the inner surface 3B of flange 4. It should be noted that the sealing part 12 can also be placed against the contact surface of the rolling elements 7 instead of against the head section 3A of the race 3 such that the head section 3A can fully be used as a coupling or fastening part 14. In this preferable embodiment, the fastening elements are teeth 14 which can have any suitable shape and preferably made of pressed metal powder like the race. The teeth 14, as shown, face outward from the inner race 3 in a direction paralleling the rotational axis of the shaft 2. The inner surface 3C of race 3 is smooth and rounded or smoothly passes over into the flange side 3D of flange 4. The fact that the radius of curvature R theoretically remains constant for various inside diameters D is favorable. The shaft 2, which is connected to the bearing 1, has a smooth shaft stub 15, which end 16 is provided with a fine thread 16A on which lock nut 17 and a ring 18 are applied. The ring 18 comprises a section 19, which has the same shape as the round or smooth transition section of the inner race 3, such that a relatively large contact area is formed between the ring 18 and transition section of the inner race 3 when the nut 17 is tightened. Tests indicated that, the inner race 3 has a favorable stress distribution, i.e. that high stress concentrations do not occur at the point of contact between the nut 17 and flange surface 3C, 3D when under load. Further, the shafts 2 comprises a shoulder 20 against which a ring 21 with teeth 21A is applied. The teeth 21A mesh into the teeth 14 of the inner race 3. Ringlike element 21 is shrunk fitted on the shaft stub 15, which provides fastening of the shaft to bearing 1 in a simple manner. According to the present invention, the shoulder 20 of shaft 2 itself can also be provided with teeth that mesh directly into the teeth 14 of the inner race 3 instead of having a ring-like element 21 which is shrunk fitted on the shaft stub 15 for fastening purposes.

Further, by using a fine thread 16A on the end part 16 of the shaft stub 15, clearance between the teeth 14 and 21A can be eliminated by tightening the nut 17. Nut 17 is locked against turning on the shaft stub 15 in a known manner, e.g. by a pin 22.

It should be noted that the present invention is not limited to the embodiment as represented, but that all embodiments of a shaft-bearing-arrangement according to the present invention are included that are characterized by a detachable, power-transmitting connection at the so-called head section or race ring end part of the bearing, while the inner race ring surface surrounding the shaft is principally not power transmittably connected to said shaft part.

What we claim is:

1. In a hub bearing unit assembly having an inner and outer race ring, each having unified therewith a fastening flange, rows of rolling elements located between said races, said rolling elements being separated from one another by means of a cage, said inner and outer race having seals coupled thereto, said seals acting to retain a lubricant contained between the rolling elements, and a driving shaft, the improvement comprising the end part head section of said inner race opposite its respective flange section and situated outside the inner side of said race ring having formed thereon coupling means, adapted to be coupled to said driving shaft and, by means of which coupling means said inner race is connected to said shaft so as to transmit power to said inner race, the inner side of said inner race facing said shaft in a nonpower transmissible manner.

2. The bearing assembly according to claim 1, wherein said inner race inner side has a smooth inside surface, and said head section being provided with protruding connecting elements forming a part of said coupling means.

3. The bearing assembly according to claim 1, wherein said coupling means is formed in part by a plurality of teeth located on said head section of said inner race, said teeth being mainly radially oriented.

4. The bearing assembly according to claim 1, wherein said coupling means includes a first plurality of teeth of a ring-like means which is attached to said shaft and which teeth mesh or engage with a plurality of further, oppositely directed teeth formed on said head section of the inner race.

5. The bearing assembly according to claim 1, wherein said coupling means includes a first plurality of teeth provided on a shoulder of said shaft or of part of said shaft and which mesh or engage into a second plurality of oppositely directed teeth.

6. The bearing assembly of claim 1, wherein the transition from the outer flange surface to the inside diameter or inner surface of the inner bearing race is a smooth rounded section.

7. The bearing assembly according to claim 6, wherein the radius of curvature of said smooth rounded section remains constant with the various inside diameters of said inner race.

8. The bearing assembly according to claim 6, wherein a matching end ring fits against said smooth transition from the outer section of the flange surface to the inner surface of said inner race.

9. The bearing assembly according to claim 1, wherein said inner and outer bearing races and said connecting elements are pressed metal powder.

10. A shaft bearing arrangement provided with a roller bearing according to claim 1, said bearing being fastened to a power transmitting shaft, said inner race having a relatively large inside diameter and surrounding said shaft, wherein said shaft, because of said relatively large inside diameter inner race, is provided with a fine thread on which an end nut and collar is fitted against the smooth or rounded outer section of the flange section and applied such that, by tightening said nut, clearance in the fastening section between said inner race and said shaft is eliminated.

11. A hub bearing and drive shaft assembly comprising a rotatable drive shaft, a bearing including a flange inner race and a flanged outer race separated by a plurality of caged rolling elements and sealed for the containment of lubricant, said inner race having a head section including a first plurality of coupling elements positioned to face outward from said inner race in a direction paralleling the axis about which said shaft rotates, said shaft including a further plurality of coupling elements positioned thereon so as to be engageable in a power transmissible manner with said first plurality of coupling elements for providing an axially directed power coupling between said shaft and said inner race.

12. The assembly of claim 1, wherein said first plurality of coupling elements are a first plurality of teeth located on said head section of said inner race, said teeth bearing radially oriented.

13. The assembly of claim 12, wherein said second plurality of coupling elements are a second plurality of teeth located on a shoulder of said shaft in a direction opposite to the orientation of said first plurality of teeth.

14. The assembly of claim 13, wherein said inner race has a transition area from said inner side thereof opposite said head section, and wherein said shaft is provided with a threaded end protruding from said inner race past said transition area, a locking means threadably mounted onto said shaft and adapted to be tightenable on said inner race transition area for axially urging said first and second coupling elements against each other.

* * * * *

UNITED STATES PATENT AND TRADEMARK OFFICE
CERTIFICATE OF CORRECTION

PATENT NO. : 4,047,770
DATED : September 13, 1977
INVENTOR(S) : Abraham Korenhof, et al It is certified that error appears in the above-identified patent and that said Letters Patent are hereby corrected as shown below:

Column 4, line 18 change "flange" to --flanged--.

Column 4, line 30 change "1" to --11--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*